United States Patent [19]

Golubenko et al.

[11] Patent Number: 4,635,990
[45] Date of Patent: Jan. 13, 1987

[54] RESILIENT WHEEL OF A RAILWAY CAR

[75] Inventors: Alexandr L. Golubenko; Viktor P. Turchin; Alexei N. Konyaev; Igor N. Sukhov; Nikolai N. Kaljuzhny; Arkady S. Filonov; Alexei P. Koropets, all of Voroshilovgrad; Mikhail I. Pinovsky, Omsk; Viktor P. Tkachenko; Nikolai M. Kramar, both of Voroshilovgrad, all of U.S.S.R.

[73] Assignee: Voroshilovgradsky Mashinostroitelny Institut, Voroshilovgrad, U.S.S.R.

[21] Appl. No.: 596,465

[22] PCT Filed: Jul. 7, 1983

[86] PCT No.: PCT/SU83/00024
 § 371 Date: Mar. 5, 1984
 § 102(e) Date: Mar. 5, 1984

[87] PCT Pub. No.: WO84/00328
 PCT Pub. Date: Feb. 2, 1984

[30] Foreign Application Priority Data

Jul. 7, 1982 [SU] U.S.S.R. ............................ 3465559
Jun. 15, 1983 [SU] U.S.S.R. ............................ 3600351
Jun. 15, 1983 [SU] U.S.S.R. ............................ 3600353
Jun. 15, 1983 [SU] U.S.S.R. ............................ 3600352

[51] Int. Cl.[4] .................... B60B 17/00; B60B 9/12
[52] U.S. Cl. .............................. 295/11; 152/43; 152/48; 152/49; 295/7
[58] Field of Search ............... 295/7, 11, 21, 23; 152/41, 43, 48, 49, 50

[56] References Cited

U.S. PATENT DOCUMENTS 1,888,499 11/1932 Gunn ........................ 295/11
2,294,818 9/1942 Williams ................. 295/11
2,800,357 7/1957 Boschi ..................... 295/11
2,853,337 9/1958 Boschi ..................... 295/11
4,318,564 3/1982 Brauer ..................... 295/11

FOREIGN PATENT DOCUMENTS 1137065 4/1963 Fed. Rep. of Germany .
1157250 11/1963 Fed. Rep. of Germany ....... 295/11
1158544 6/1964 Fed. Rep. of Germany .
2406206 10/1977 Fed. Rep. of Germany ....... 295/11
2545032 8/1979 Fed. Rep. of Germany ....... 295/11
447305 10/1974 U.S.S.R. ............................ 295/11

Primary Examiner—Randolph A. Reese
Attorney, Agent, or Firm—Fleit, Jacobson, Cohn & Price

[57] ABSTRACT

A resilient wheel of a railway car includes a hub (1) with an annular projection (2) on the outer surface thereof, and a pressure disk (8), the hub and the disk being connected by bracing elements (7), and having ventilation ports (3, 9). An inner rim (4) having an annular projection (5) on the inner surface thereof is interposed between the hub (1) and the pressure disk (8). The wheel further includes resilient elements (13) some of which are reinforced and disposed between the side surfaces of the pressure disk (8) and the annular projections (2, 5) of the inner rim (4) and hub (1), while one more resilient element is disposed between the hub (1) and the inner surface of the annular projection (5) of the inner rim (4).

The resilient element disposed between the hub (1) and the inner surface of the annular projection (5) of the inner rim (4) is fashioned as a silent block (14) capable of turning relative to at least one of the wheel parts (5 and/or 1) engageable therewith, the ventilation ports (3, 9) of the annular projection (2) of the hub (1) and the pressure disk (8) being located in front of the two end faces of the silent block (14).

6 Claims, 10 Drawing Figures

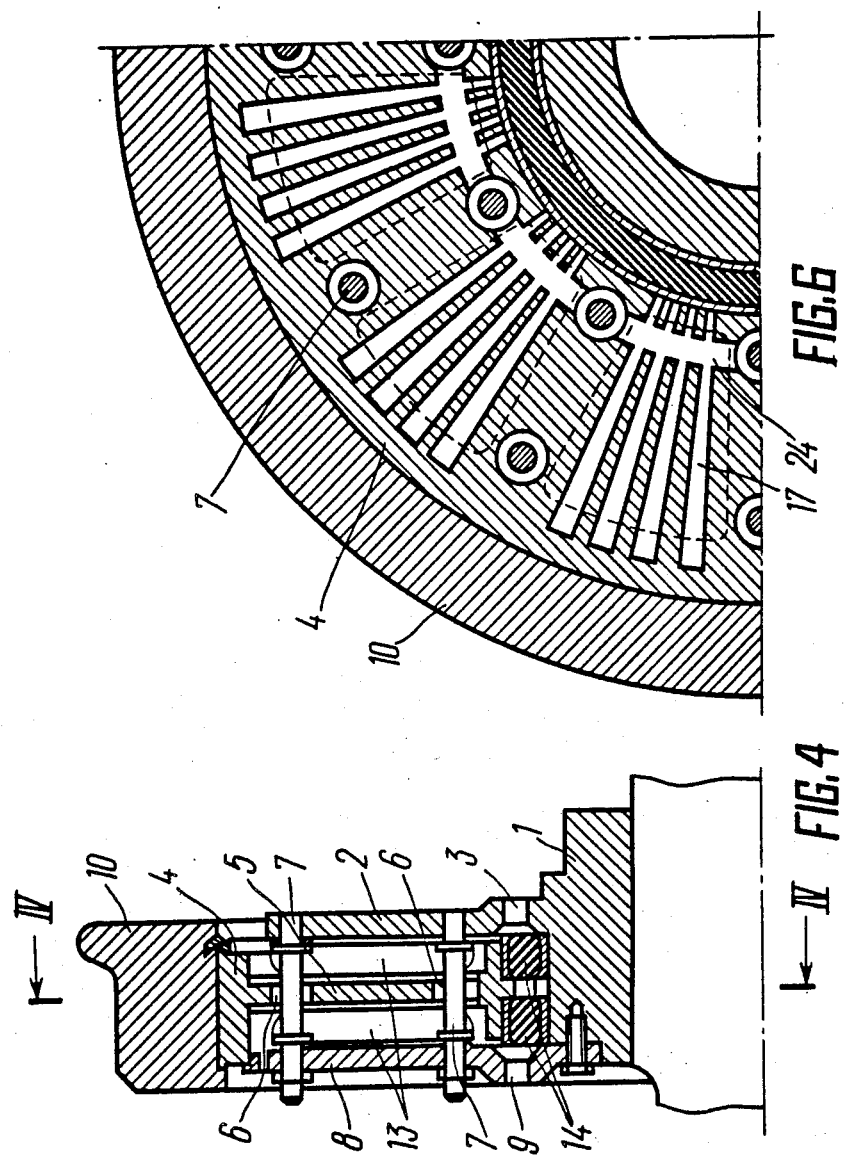

RESILIENT WHEEL OF A RAILWAY CAR

FIELD OF THE INVENTION

This invention relates to railway transport, and more particularly to resilient wheel constructions.

BACKGROUND ART

In view of the ever growing demands imposed on the organization of high-speed railway travel and due to the increasing payload capacity of railway cars, much attention has been devoted to designing such wheel constructions in which by introducing resilient elements directly into the wheel its dynamic characteristics are greatly improved. Wheels of such a construction may be used in every type of railway vehicle, particularly in trams, subway trains, and railway cars. Such wheels can be employed with the utmost advantage in locomotives.

At present, the most advanced resilient wheel designs are those in which resilient elements have the form of rubber shock absorbers.

In such an arrangement, depending on the type of deformations experienced by the resilient elements, the wheels may be broken down into three groups, the first group including wheels resilient elements of which are subject to compressive strains under the action of vertical loads. These resilient wheels are simple and inexpensive to fabricate, although they suffer from insufficient axial rigidity and excessive radial rigidity, and therefore their efficient application is inherently limited. In addition, when shoe brakes are used, as is the case with most modern locomotives, it is normally very difficult to restrict the influx of heat to the rubber elements of the resilient wheels of the above described construction.

One more type of resilient wheels construction includes resilient elements which experience shearing strains under the action of vertical loads. Such resilient wheels are most popular in the railway transport nowdays. Their use enables to reduce the harmful effect of dynamic impacts on the rails and improve operating conditions both for the wheels and parts and components of the bogie, such as the power transmission of the locomotive, axle boxes, suspension and wheel set axles.

The third group incorporates wheels in which resilient elements are subjected to both shearing and compressive strains under the action of vertical loads. However, these wheels are rather complex in construction and have practically no advantages over the other wheel constructions, due to which they have not been extensively applied in the railroad transport.

For improved operation of the locomotive's bogie having parts and components thereof directly connected to the resilient wheels making up a wheel set, the wheel rigidity, which depends on the geometry, size and construction of the resilient elements, plays an important role.

It is to be especially noted that a reduction in the dynamic impacts to which parts and components of the bogie are exposed depends largely on the correct ratio between the rigidity characteristics of the resilient wheel in the radial and tangential directions, since the radial rigidity influences the dynamic processes of interaction between the resilient wheel and the rail determining the vertical dynamics of the wheel, wheel set axle, axle box, reducing gears and the housing of the traction motor; whereas the tangential rigidity determines the effect of these dynamic processes on the power transmission which includes the traction electric motor, reducer, wheel set axles, and wheels.

There is known a resilient wheel of a railway car comprising a hub with annular projections on the outer surface thereof, and an outer rim having annular projections extending inwardly from the inner surface thereof (cf. West German Pat. No. 2,406,206 IPC B 60b 9/12, published 1975).

Resilient elements of this wheel which are subjected to compressive strains under the action of vertical loads have the form of rectangular plates pressed between the inner surface of the outer rim and the outer surface of the hub, the annular projections serving to restrict axial deformations of the wheel's resilient element.

The above arrangement of the resilient elements provides the wheel with required radial rigidity, thereby maintaining angular velocity of the hub and the wheel set axle rigidly connected thereto, as well as of the reducer and the armature of the traction motor when the wheel dynamically interacts with the rail. This ensures normal operating conditions for the traction motor of the locomotive. At the same time, high radial rigidity of the resilient wheel is caused by insufficient side surface area of the resilient elements, which by virtue of their elastic and shock-absorbing properties fail to sufficiently reduce the action of dynamic loads on the parts and components of the bogie directly connected to the resilient wheel, whereby the travel of the locomotive at high speed will result in that the wheel set axle reducing gears, traction motor and axle boxes may become susceptible to rapid wear and failure.

Also, during extended shoe braking the rolling surface of the wheel's outer rim may heat to as high as 600° C. to cause in the resilient elements in contact therewith a loss of elastic and shock-absorbing properties, because most rubber types are not capable to withstand temperatures in excess of 80° C.

There is also known a resilient wheel of a railway car comprising a wheel hub with an annular projection on the outer surface thereof, and a pressure disk interconnected by bracing elements (cf. West German Pat. No. 1,158,544; IPC B 61f 9/12, published 1964).

Interposed between side surfaces of the annular projection of the hub and pressure disk are inner rim having an annular projection extending from the inner surface thereof and resilient elements having the form of rubber members or blocks reinforced by plates and arranged about the circumference with gaps or spaces therebetween.

The aforedescribed arrangement of the resilient elements imparts required rigidity to the wheel in the radial direction to result in reduced impact loads exerted on parts and components of the bogie and, as a consequence, in their improved operating conditions and extended service life.

However, inherent in the above wheel construction is an excessive tangential rigidity of this wheel caused by the well developed side surface of the resilient element and a rather small thickness thereof. Such a high tangential rigidity of the wheel fails to provide normal operating conditions for the power drive, particularly for the traction motor of the locomotive. In addition, this multiple block construction of the resilient elements of the wheel complicates fabrication of the wheel and shortens its service life.

One more resilient wheel construction is known as exemplified in West German Pat. No. 2,545,032; IPC B 60b 9/12, published 1979. This wheel has a hub and an outer rim.

Resilient elements of this wheel have the form of four rings arranged at an angle to the vertical axis of the cross-section of the wheel; two of these rings engage with the outer surface of the wheel's hub, while two other rings cooperate with the inner surface of the outer rim. Interposed between the two pairs of resilient elements are clamping rings.

This structural arrangement of the resilient elements, while providing the required rigidity in the radial and tangential directions, suffers from a disadvantage residing in that the positioning of one pair of the resilient rings directly on the inner surface of the outer rim results in that during extended shoe braking (with a temperature of the rolling surface of the outer rim up to 600° C.) the rubber of the resilient elements tends to be damaged, thereby affecting the reliability and durability of the resilient wheel.

Another disadvantage resides in that in the resilient wheel of the above construction the pairs of the resilient elements are engaged in succession, which causes an increase in the resonance oscillations of the wheel as a consequence of rail surface irregularities. This in turn results in a less stable travel of the locomotive.

Still another resilient wheel which bears the closest resemblance to the one to be disclosed in this description comprises interconnected by bracing elements and provided with ventilation ports a hub with an annular projection on the outer surface thereof and a pressure disk, an inner rim having an annular projection on the inner surface being interposed between the hub and the pressure disk, and resilient elements, some of which are reinforced and disposed between the side surfaces of the pressure disk and the projections of the inner rim and hub; a separate resilient element being interposed between the hub and the inner surface of the annular projection of the inner rim. (cf. USSR Inventor's Certificate No. 447,305; IPC B 60B 9/12, published 1974).

The resilient elements are of unitized construction. The resilient element disposed between the hub and the inner surface of the annular projection of the inner rim is comprised of two rubber rings arranged on the hub with a certain spacing therebetween. Each resilient element interposed between the side surfaces of the pressure disk and the annular projections of the inner ring and hub is fashioned as a rubber sleeve with two metal plates vulcanized to the two sides thereof; a part of the plate engaging with the side surface of the annular projection of the inner rim is vulcanized to the corresponding rubber ring, while these rubber sleeves have holes for the passage of air and insertion of the bracing elements.

The above arrangement of the resilient elements provides required radial rigidity of the wheel and give a somewhat excessive tangential rigidity, although such wheels are well suited for locomotives travelling at a speed of up to 27.8 m/sec.

However, when employed in high-speed locomotives or locomotives in which axial loads on the rails are heavy, conditions for operation of the power drive of the locomotive in terms of torsional vibrations become less favorable.

Also, adjustment of such resilient wheels for axial rigidity is complicated, which limits their application on different types of locomotives.

The provision of holes in the rubber sleeves reduces their service life due to the generation of stresses around these holes caused by cyclic impact loads when the wheel rolls on the rail.

In addition, the ventilation ports in these wheels are arranged equidistantly in the medium portion of the annular projection of the hub and the pressure disk, which fails to ensure sufficient heat removal from the resilient elements disposed between the inner surface of the annular projection of the inner rim of the wheel and the hub thereof.

SUMMARY OF THE INVENTION

The present invention is directed toward the provision of such a resilient wheel of a railway car in which through specific arrangement of resilient elements and their positioning relative to a wheel hub, pressure disk and an inner rim dynamic characteristics of the wheel would be improved to result in a more reliable operation, extended service life thereof and simplified fabrication of the wheel.

This aim of the invention has been attained by that in a resilient wheel comprising a hub with an annular projection on the outer surface thereof and a pressure disk, the pressure disk being connected by bracing elements and provided with ventilation ports, an inner rim having an annular extension disposed between the hub and the pressure disk, and resilient elements some of which are reinforced and disposed between side surfaces of the pressure disk and the annular projections of the inner rim and hub, while another resilient element is disposed between the hub and the inner surface of the annular projection of the inner rim, according to the invention, the resilient element disposed between the hub and the inner surface of the annular projection of the inner rim is fashioned as a silent block capable of turning relative to at least one of wheel parts engageable therewith, the ventilation ports of the annular projection of the hub and the pressure disk being located in front of two end faces of the silent block.

Such an arrangement of the resilient wheel provides for independent adjustment of its rigidity both in the radial and tangential directions, which makes it possible to employ the wheels in any type of locomotives, those operating at high speeds and those that have heavy loads exerted on the wheel axles. These capabilities of the resilient wheel embodying the present invention are accounted for by the fact that vertical loads are taken up both by the resilient elements interposed between the side surfaces of the pressure disk and the annular projections of the inner rim and hub, and by the silent block, which fails to participate in the transmission of traction effort. In addition, the location of the ventilation ports opposite the end faces of the silent block assures sufficient removal of heat from all the resilient elements to result in greater reliability and durability of the resilient wheel.

In the proposed resilient wheel construction the ventilation ports arranged in front of the end faces of the silent block communicate with ventilation passages provided on the side surfaces of the annular projection of the inner rim serving to remove heat from the resilient elements disposed on these surfaces.

This arrangement still further improves the reliability and extends the service life of the resilient elements and the silent block while preserving their elastic and shock-absorbing properties.

The above advantageous effect can be explained by that the provision of air passages on the side surfaces of the annular projection of the inner rim facilitates the flow of air from the end faces of the silent block toward the periphery of the wheel.

According to one more feature of the invention, the outer ring of the silent block is capable of axial displacement relative to the inner surface of the annular projection of the inner rim of the wheel.

This enables to adjust the wheel's rigidity in the axial direction, which ensures an increase in the critical speed at which the locomotive can travel without loosing its stability under various loads exerted by the wheels on the rails.

Preferably, at least one of the rings of the silent block has friction gaskets.

The provision of such gaskets allows to ensure optimum conditions for the resilient wheel operation during start-off of the locomotive. It also enables to reduce pulsations in the force of friction and the wheel slip through the provision of added friction between the rings of the silent block and the inner surface of the annular projection of the inner rim or of the hub.

Alternatively, the resilient wheel according to the invention may have two silent blocks disposed between the hub and the inner surface of the annular projection of the inner rim being provided with a shoulder separating the two silent blocks and partially restricting their axial displacement.

The provision of two silent blocks makes it possible to use the resilient wheels in locomotives with heavy axial loads exerted on the rails.

Preferably, in resilient wheels with two silent blocks the resilient elements disposed between the side surfaces of the pressure disk and the annular projections of the inner rim and hub are fashioned as separate blocks, gaps between the blocks accommodating disposed radially in pairs bracing elements connecting the pressure disk and the annular projection of the hub, the bracing elements being spaced radially from one another in pairs a maximum possible distance.

Such an arrangement of the bracing elements in gaps between the blocks of resilient elements imparts greater strength to the wheel.

Advisably, the rubber sleeve of the silent block has in cross-section the shape of an ellipse extended toward the end faces of the silent block and confined in this direction by two parallel cylindrical surfaces.

This cross-sectional configuration of the silent block facilitates pressing thereof between the rings.

BRIEF DESCRIPTION OF THE DRAWINGS

The invention will now be described in greater detail with reference to various specific embodiments thereof taken in conjunction with the accompanying drawings, in which:

FIG. 3 is a section taken along the line III—III in FIG. 1;

FIG. 4 shows the same as illustrated in FIG. 1 using two silent blocks, block-type resilient elements, and bracing elements arranged radially in pairs;

FIG. 6 is a section taken along the line VI—VI in FIG. 4;

BEST MODE OF CARRYING OUT THE INVENTION

Figure 1:
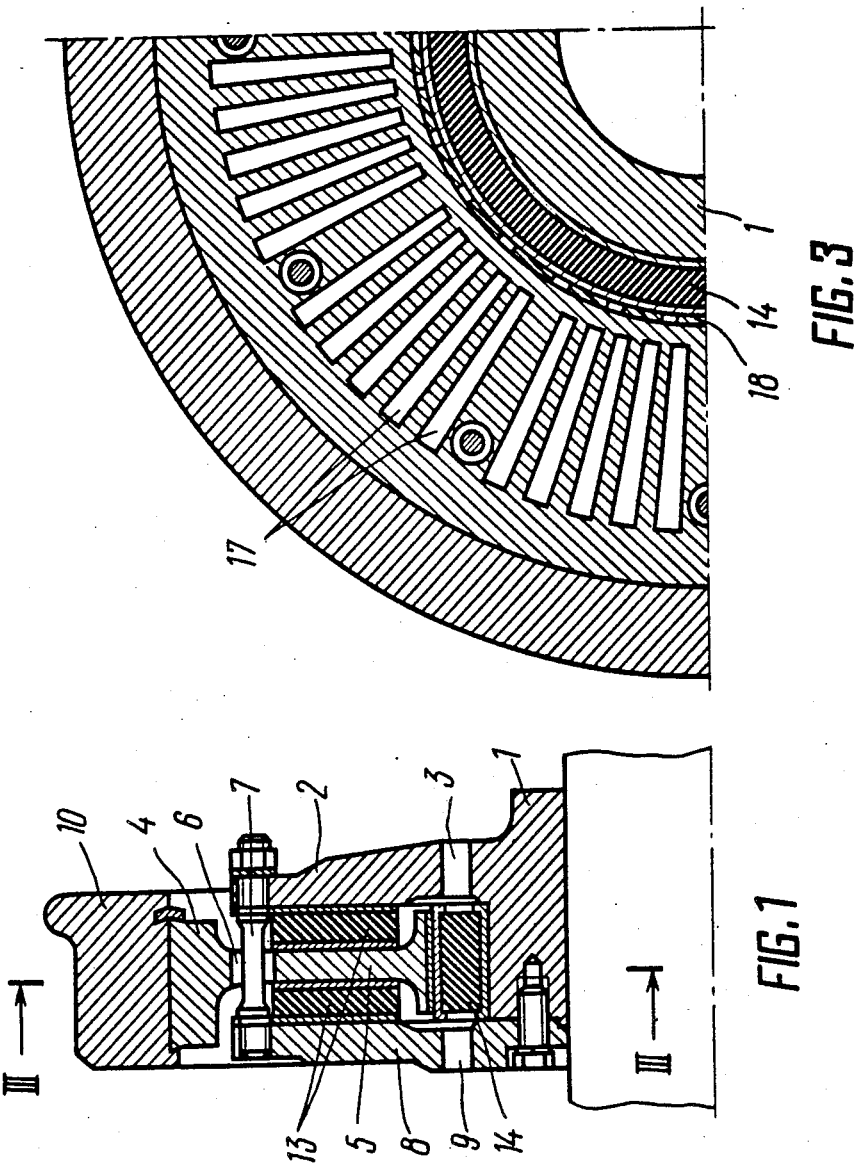
FIG. 1 is a cross-sectional view of a resilient wheel of a railway carriage according to the invention.
Figure 2:
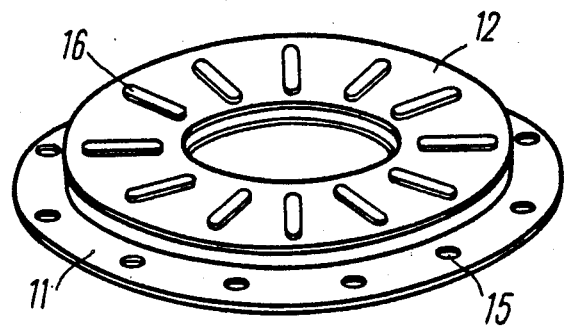
FIG. 2 is a general axonometric view of the resilient element of the wheel interposed between side surfaces of a pressure disk and annular projections of inner rim and hub.

A resilient wheel of a railway car comprises a hub 1 (FIG. 1) having an annular projection 2, the outer surface of which is provided with ventilation ports 3, an inner rim 4 with an annular projection 5 extending from the inner surface thereof having holes 6 to receive bracing elements 7, and a pressure disk 8 also having ventilation ports 9. The wheel also comprises an outer rim 10, resilient elements 13 (FIG. 1) reinforced by plates 11, 12 (FIG. 2), these resilient elements 13 being disposed between side surfaces of the pressure disk 8, annular projection 2 of the hub 1 and the annular projection 5 of the inner rim 4, as well as a silent block 14 interposed between the inner surface of the annular projection 5 of the inner rim 4 and the hub 1.

To provide for independent adjustment of rigidity both in the radial and tangential directions, the silent block 14 is capable of being turned relative to at least one wheel part engaging therewith. An outer ring of the silent block 14 can be axially displaced relative to the inner surface of the annular projection 5 of the inner rim 4, whereby rigidity of the wheel can be adjusted in the axial direction.

In order to prevent the silent block 14 from axial displacement relative to the hub, its inner metal ring is disposed between the side surfaces of the pressure disk 8 and the annular projection 2 of the hub 1.

To prevent the resilient elements 13 from turning relative to the side surfaces of the pressure disk 8 and the annular projections 2, 5 of the inner rim 4 and hub 1, one of the reinforcement plates 11 of the resilient element 13 has a smooth surface and is of a diameter substantially greater than the outer diameter of the resilient element 13 per se. Holes 15 are provided in this plate 11 to receive the bracing elements 7 to fix the resilient element 13 to the pressure disk 8 or to the annular projection 2 of the hub 1.

The other plate 12 (FIG. 2) of the resilient element 13 has on its surface lock members 16 which enter into recesses of the side surfaces of the annular projection 5 of the inner rim 4.

Under the action of vertical loads the resilient elements 13 (FIG. 1) are subjected to shearing to strains, while the rubber sleeve of the silent block 14 is subjected to compressive strains.

The holes 6 in the annular projection 5 of the inner rim 4 are adapted to receive the bracing elements 7, so that during any displacements of the inner rim 4 the edges of these holes 6 fail to come into contact with the bracing elements 7.

The rubber sleeve of the silent block 14 is pressed between its metal rings, whereas the resilient elements 13 reinforced by the plates 11, 12 are compressed in the course of assembly by the side surfaces of the pressure disk 8 and by the annular projections 2, 5 of the hub 1 and the inner rim 4 such that during operation at the maximum of dynamic loads exerted thereon these resilient elements 13 and the rubber sleeve of the silent block 14 would fail to be subjected to tension strains but work exclusively for compression.

Excessive heating of the resilient wheel is prevented through the circulation of air between the resilient elements 13 and the silent block 14. For this purpose the pressure disk 8 and the annular projection 2 of the hub 1 are provided with the ventilation ports 3 and 9 opposite the end faces of the silent block 14, the side surfaces of the annular projection 5 of the inner rim 4 having ventilation passages 17 (FIG. 3).

For imparting a greater tangential rigidity to the resilient wheel during start-off, at least one of the rings of the silent block 14 is provided with friction gaskets 18.

Figure 5:
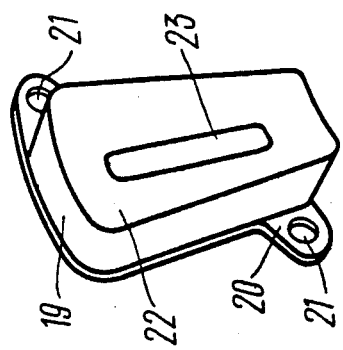
FIG. 5 is a general view of the block-type resilient element interposed between the side surfaces of the pressure disk and annular projections of the inner rim and hub.

With reference to FIG. 4, two silent blocks 14 may be provided when greater axial loads are exerted on the resilient wheel to prevent overheating of the resilient elements 13 and the silent block 14 and assure the required rigidity of the wheel. In this case, the resilient elements 13 disposed between the side surfaces of the pressure disk 8 and the annular projections 2, 5 of the hub 1 and the inner rim 4 have the form of separate blocks 19 (FIG. 5) shaped as sectors of a circle.

One of reinforcement plates 20 of each such block 19 of the resilient element 13 shaped as a sector of a circle is smooth and has ears in which holes 21 are provided for the passage of the bracing elements 7 therethrough. Another reinforcement plate 22 has a lock 23 which enter in a slot provided on the side surface of the annular projection 5 of the inner rim 4.

For imparting a greater mechanical strength to the wheel the bracing elements 7 are accommodated in pairs in the gaps between the blocks 19 (FIG. 6), the bracing elements 7 in each of the pairs being spaced from each other radially a maximum possible distance.

Figure 7:
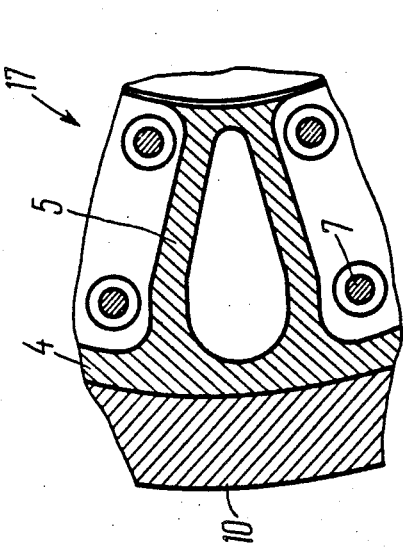
FIG. 7 is a modified form of air passages on the side surfaces of the annular projections of the inner rim.
Figure 8:
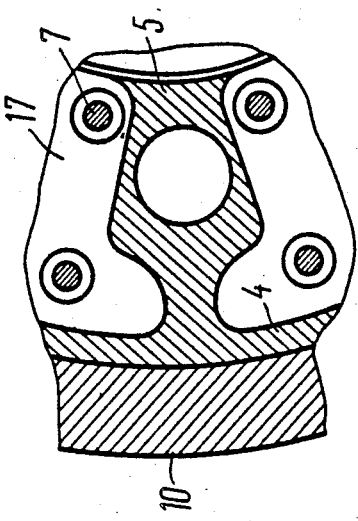
FIG. 8 is one more modification of air passages on the side surfaces of the annular projection of the inner rim.

An annular air passage 24 (FIG. 6) provided on the side surfaces of the annular projection 5 of the inner rim 4 intersects radially with the air passages 17. Alternatively, another arrangement of the air passages is possible, as illustrated in FIGS. 7 and 8.

Figure 9:
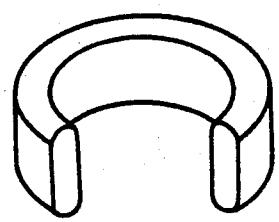
FIG. 9 is a view of a rubber sleeve of the silent block according to the invention.

The rubber sleeve of the silent block 14 (FIG. 9) has in cross-section the shape of an ellipse extended toward the end faces of the silent block 14 and confined by two parallel cylindrical surfaces, this elliptical configuration of the rubber sleeve facilitating pressing thereof between the inner and outer rings of the silent block 14.

Figure 10:
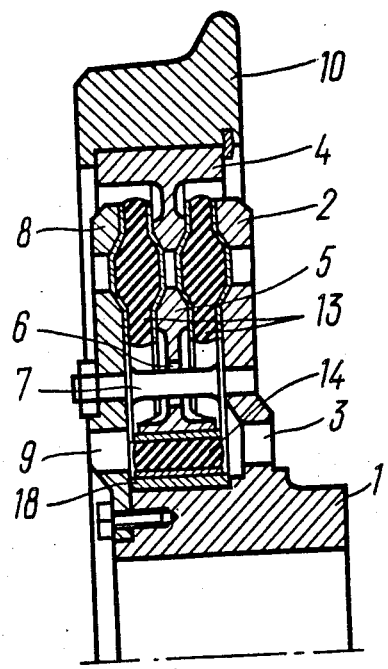
FIG. 10 is a modified form of the resilient wheel similar to the one shown in FIG. 1 in which the bracing elements are arranged about the periphery of the pressure disk and annular projections of the hub.

For locomotives with axial loads up to 20 tons the bracing elements 7 (FIG. 10) act to draw together the pressure disk 8 and the annular projection 2 of the hub 1, the pressure being applied about a circle between the resilient elements 13 and the silent block 14.

The resilient wheel of a railway car operates in the following manner.

When a locomotive provided with the resilient wheels constructed according to the invention is set in motion, the wheels take up loads in the tangential direction from the locomotive's power transmission, as vertical and lateral dynamic loads caused by railway switches, rail joints, curved railway stretches and rail surface irregularities.

These loads are transmitted to the elements of the car bogie in the form of vibrations which affect its performance and reduce the service life of these elements.

The proposed resilient wheel enables to considerably reduce the negative effect of these vibrations on the elements of the car bogie and thereby improve their reliability and durability. The wheels constructed according to the invention provide for a higher speed of locomotives and increase the payload capacity of railway cars.

In the wheel according to the invention only the resilient elements 13 disposed between the side surfaces of the pressure disk 8 and the annular projections 2 and 5 of the hub 1 and inner rim 4 take part in the transmission of tangential loads, whereas both resilient elements 13 and 14 take up the vertical and lateral loads. Such a combined participation of the resilient elements is ensured by virtue of the silent block 14 being capable to turn relative to the inner surface of the annular projection 5 of the inner rim 4 and the hub 1. Thanks to the above structural arrangement, by varying the geometry and dimensions of the resilient elements 13, 14 it is possible to separately adjust the wheel's rigidity in the radial and tangential directions to fit any type of locomotive.

For imparting to the wheel a greater tangential rigidity during start-off of the locomotive, it is possible to include the silent block 14 in the transmission of tractive force for a certain period, this being attained by the provision of the friction gaskets 18 on one of the rings of the silent block 14. The above also makes it possible to adjust axial rigidity of the wheel, this rigidity being to a large extent determined by the rigidity of the resilient elements 13 interposed between the side surfaces of the pressure disk 8 and the annular projections 2, 5 of the inner rim 4 and hub 1.

Under the action of dynamic loads heat is generated in the resilient elements 13, 14 of the wheel, this heat affecting their elastic and shock-absorbing abilities and reducing their service life. Overheating is therefore prevented through the provision of the ventilation ports 3 and 9 in the pressure disk 8 and the annular extension 2 of the hub 1, as well as through the provision of the air passages 17 on the side surfaces of the annular projection 5 of the inner rim 4. The air tends to enter these ventilation ports 3 and 9 to cool the silent block 14 and is thereafter conveyed to the air passages 17 to remove heat from the resilient elements 13 disposed between the side surfaces of the pressure disk 8 and the annular projections 2, 5 of the inner rim 4 and hub 1.

Industrial Applicability

The invention can find application in railway cars.

What is claimed is:

1. A resilient wheel of a railway car, said resilient wheel comprising:
  a hub with an annular projection located on an outer surface thereof,
  a pressure disk, the hub and the pressure disk being connected by bracing elements,
  ventilation ports defined by said annular projection of the hub and said pressure disk,
  an inner rim having an annular projection disposed between the hub and the pressure disk,
  first resilient elements subject to shearing forces, some of which are reinforced and disposed between side surfaces of the pressure disk and the annular projections of the inner rim and the hub, and
  a second resilient element subject to radially directed compressive forces being disposed between the hub and an inner surface of the annular projection of the inner rim, said second resilient element forming a silent block capable of turning relative to at least one of the annular projection of the inner rim and the hub engageable therewith, the wheel being independently adjustable for rigidity in the radial and tangential directions, the ventilation ports of the annular projection of the hub and the pressure disk being located in front of two end faces of the silent block.

2. A resilient wheel according to claim 1, wherein the ventilation ports arranged in front of the two end faces of the silent block communicate with ventilation passages provided on side surfaces of the annular projection of the inner rim to remove heat from the first resilient elements disposed on these surfaces.

3. A resilient wheel according to claim 1, wherein an outer ring of the silent block is capable of axial displacement relative to the inner surface of the annular projection of the inner rim.

4. A resilient wheel according to claim 1, wherein two rings surround said silent block and at least one of the two rings of the silent block includes a friction gasket.

5. A resilient wheel according to claim 1, wherein two silent blocks are disposed between the hub and the inner surface of the annular projection of the inner rim, said inner rim being provided with a shoulder separating the two silent blocks and partially restricting their axial displacement.

6. A resilient wheel according to claim 5, wherein said first resilient elements disposed between the side surfaces of the pressure disk and annular projections of the inner rim and hub are fashioned as separate blocks, gaps between the separate blocks accommodating, disposed radially in pairs, the bracing elements connecting the pressure disk and the annular projection of the hub, the bracing elements being spaced radially from one another in the pairs a maximum possible distance.

* * * * *